Patented Jan. 2, 1940

2,185,656

UNITED STATES PATENT OFFICE 2,185,656

PROCESS FOR HARDENING FILAMENTS, BANDS, FILMS, AND OTHER SHAPED ARTICLES COMPOSED OF POLYMERIZATION PRODUCTS OF DIENE HYDROCARBONS

Hein Israel Waterman and Willem Leendert Johannes de Nie, Delft, Netherlands, assignors to Shell Development Company, San Francisco, Calif., a corporation of Delaware No Drawing. Application April 25, 1938, Serial No. 204,226. In the Netherlands May 8, 1937

12 Claims. (Cl. 260—93)

The present invention relates to a new and improved process for the hardening and toughening of masses, supported films, extrusion products and the like, fabricated from the polymerization products of diene hydrocarbons.

It is known that diene hydrocarbons, such as, for instance, butadiene, may be polymerized to yield products which may be fabricated into numerous useful objects. According to the accepted mode of fabrication, discs, panels, threads, foils, decorative and protective films and other objects are shaped from a partially polymerized product, known as the "undistillable" polymer, by molding, flowing, dipping, extruding, rolling, etc. The soft and pliable object is then subjected to a suitable treatment whereby the desired degrees of strength, hardness, toughness, etc., are obtained.

During the hardening treatment the polymer becomes less soluble in organic solvents, more inert to chemical reaction, and more difficultly fusible. While these changes in properties may be due to a large extent to the continuation of the polymerization reactions to form molecules of greater molecular weight, they are often predominantly the result of other reactions induced by reactants and catalysts employed in the hardening process.

For example, it is known that products ranging in character from a pliable, tough material to an ebonite-like material may be obtained by subjecting the polymer to a suitable vulcanization treatment. The products hardened in this way, however, are in many respects of inferior quality and newer methods have been proposed in which the amount of vulcanization agent used is reduced to a minimum. It has also been found that in the presence of oxygen or oxygen-liberating bodies at ordinary or slightly elevated temperatures a slow hardening of the polymer occurs, but in this case also the product, being partially oxidized, is of inferior quality. The detrimental effects of oxygen and sulfur have to some extent been overcome by hardening at a more elevated temperature in an inert atmosphere. This method also has disadvantages. For example, the hardening reactions, when induced by heat alone, are very slow, unless relatively high temperatures are employed, and at the temperatures required to effect a reasonably fast hardening a certain amount of decomposition or other reactions take place which manifest themselves by imparting a brown color to the product. This color spoils the appearance of dyed and pigmented objects as well as transparent objects. Furthermore this method of hardening tends to harden the outermost polymer first, forming an impervious shell which notably retards the hardening of the underlying polymer. If the treatment is prolonged sufficiently to properly harden the innermost material the outer shell is weakened and embrittled due to overhardening. This difficulty is not restricted to comparatively thick objects such as discs, panels, etc., since even fine filaments distinctly show the outer more hardened shell when viewed in cross-section under suitable magnification.

An object of the present invention is to provide a method whereby the said synthetic objects may be relatively uniformly hardened throughout their cross-section without causing discoloration or overhardening of the outer surface. Another object of the invention is to provide a method whereby said synthetic objects may be hardened more quickly and at a relatively low temperature. Still another object of the invention is to produce hardened synthetic objects free from detrimental quantities of oxygen or sulfur.

A further object is to provide a new and improved method for the strengthening of artificial fibers fabricated from polymerization products of diene hydrocarbons. Other objects are to produce stronger and more colorless synthetic objects from the polymerization products of diene hydrocarbons, and to provide a method for the hardening of said synthetic products which may be operated continuously, economically, and on a commercial scale. Other objects and advantages of the invention will be apparent in the following description.

We have found that in the thermal hardening of polymerization products of diene hydrocarbons the presence of the vapor of a suitable organic halogen-containing compound has a very beneficial effect. Under the influence of these catalytic substances the thermal treatment may require a shorter period of heating and may be executed at a lower temperature. Under these less drastic conditions, we have found that the products suffer much less discoloration and are, moreover, stronger and relatively uniformly hardened.

Halogenated organic compounds of several classes are capable of catalyzing the hardening reactions. These applicable compounds are in the descending order of efficiency:

(1) Halogenated aromatic hydrocarbons in which one or more halogen atoms are attached to an aromatic nucleus. Examples of applicable compounds belonging to this group are chlorobenzene, dichloro-benzene, chloro-toluene, chloro-xylene, bromo-benzene, dibromo-benzene, trichloro-benzene and the like.

(2) Halogenated aromatic hydrocarbons containing a halogenated alkyl group and containing one or more halogen atoms attached to an aromatic nucleus. 3-chloro-benzal chloride, 3-chloro-benzylidene chloride and 3-choloro-benzo-tri-chloride are typical examples of this class.

(3) Halogenated aromatic hydrocarbons containing one or more halogen atoms attached to an alkyl side chain and none attached to the aromatic nucleus. Such applicable compounds include benzal chloride, benzylidene chloride, benzo-trichloride, and benzo-trifluoride.

(4) Unsaturated halogenated cycloparaffins such as chloro-cyclohexadiene and the chloro-cyclohexenes.

(5) Halogenated ethers such as alpha chloro-diethyl ether, beta beta dichloro-ethyl ether, chloro-anisole and the chlorinated diphenyl oxides.

(6) Halogenated cycloparaffins such as chloro-cyclohexane, chloro-cyclopentane, etc.

(7) Polar halogenated aliphatic hydrocarbons, such as amyl chloride, chloroform, trichlor-ethylene, and the like.

Of these various classes of compounds the first three groups are by far the most efficient and of these the first group is preferred. The above-mentioned applicable groups of compounds are all "halogen-containing organic compounds of low polarity" and we therefore designate these compounds henceforth by this term. The preferred compounds embraced in groups 1, 2 and 3 we designate as "halogenated aromatic hydrocarbons."

The temperature at which the hardening takes place is, according to the present invention, usually below 200° C. and preferably below 150° C. For example, when using monochlor-benzene vapor as a catalyst, we have found temperatures of from 120° to 130° C. to be very efficient. If, in view of its application, there is no objection to a slight discoloration of the polymerization product, the hardening may be effected also at somewhat higher temperatures. The temperatures employed should, however, always be sufficiently high to allow an effective concentration of catalyst vapor in the hardening chamber and to prevent the condensation of appreciable quantities of the catalyst on the object undergoing hardening. For this reason temperatures below about 80° C. are seldom desirable.

Since oxygen has been found to react with the polymer, especially at elevated temperatures, to give a hardened product of inferior strength, we execute our hardening treatment in a substantially inert atmosphere, such as, for instance, in an atmosphere of carbon dioxide, nitrogen, hydrogen, etc.

Although the invention is most conveniently executed at atmospheric pressure, we may also employ elevated or reduced pressures. Reduced pressure, in particular, may sometimes be advantageously employed, since it allows the use of lower temperatures with a given concentration of catalyst vapor. This is especially useful if it is desired to use catalysts of high boiling point. Likewise, through the use of reduced pressure and low temperature, the use of a gas to maintain an inert atmosphere may be avoided, since at reduced pressures and low temperatures the small amount of oxygen in rarefied air does not, in the short time required, appreciably affect the product.

The concentrations of catalyst vapor applicable to effect a satisfactory hardening may vary within wide limits. We have found that catalysts of the preferred class are generally effective even in concentrations below one per cent. of the gaseous atmosphere. Larger amounts may, however, be used without any harmful effects. The less active catalysts may require considerably higher concentrations, such as, for instance, from 2 to 10%.

The hardening treatment is continued, under suitable conditions of temperature, catalyst and pressure, until the desired degree of hardening or toughening has taken place. The time required is dependent upon the size and shape of the article to be hardened, the degree of hardening desired, the temperature employed, the catalyst used and somewhat upon the concentration of the catalyst and may, therefore, vary from a few minutes to several hours. It is, however, in all cases considerably less than that required by a thermal treatment in the absence of a catalyst.

If, for any reason, the presence of a trace of catalyst in the hardened product is objectionable, any such trace as may be present may be removed by subjecting the hardened product for a short time to a temperature of 100° to 150° C. and/or to the action of a reduced pressure.

The process, according to the invention, when applied to the hardening of continuously formed products such as fibers, threads, films, ribbons, foils, and the like, may be carried out continuously. To this end the unhardened product may be passed through a chamber which contains the desired concentration of catalyst vapor in an otherwise inert atmosphere at the desired temperature, at such a rate that upon leaving the chamber the product has undergone the desired amount of hardening treatment. It is, however, to be understood that these products may be hardened like molded objects, objects given a protective or decorative coating of the polymer, etc., in a discontinuous manner.

The present invention is applicable to the hardening of products made from polymerization products of diene hydrocarbons. For the purpose of the present invention we define a diene hydrocarbon as any hydrocarbon containing a conjugated diolefine structure and capable of being polymerized to tough or hard materials. Examples of diene hydrocarbons are butadiene, cyclopentadiene and various substituted butadienes in which one or more hydrogen atoms are replaced by a hydrocarbon radical, such as isoprene, piperylene, phenylbutadiene and the like.

By a "polymerization product of a diene hydrocarbon" we not only mean the polymers of single diene hydrocarbons, mixtures of polymers and interpolymers of diene hydrocarbons, but we mean to include these polymerization products when in admixture with other compatible polymerization products such as natural rubber, cyclocaoutchouc, polymers of vinyl chloride, vinyl acetate, vinylchloride-acetate, vinyl bromide, chloroprene, styrol and the like, and also the products formed by the polymerization of mixtures of diene hydrocarbons with other polymerizable materials such as vinyl acetate, vinyl bromide, chloroprene, styrol, or substances of the structure

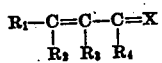

or

wherein $R_1$, $R_2$ and $R_3$ are hydrocarbon radicals or hydrogen, $R_4$ is hydrogen or an $OR_5$ group ($R_5$ being hydrogen or a hydrocarbon radical) and X is oxygen or sulphur, and the like. When polymerized with diene hydrocarbons, we have found these vinyl compounds to be particularly effective in imparting certain desirable characteristics to the finished product. Any of the above-mentioned polmerization products of diene hydrocarbons, may, of course, contain appreciable amounts of solvents, plasticizing agents, fillers, pigments, dyes, abrasive agents, metal powders and the like.

The polymerization products applicable may be prepared by resorting to any of the usual polymerization catalysts such as alkali and alkali earth metals, their mixtures and alloys, peroxides, ozonides, halides of amphoteric elements and the like. The polymerization may, likewise, be executed in the presence of a suitable solvent or diluent, or the polymerization product may be dissolved in a suitable solvent such as benzene, toluene, cyclohexane, methylene chloride, carbon tetrachloride, ethylene chloride, ether, dioxane, etc., or liquids such as water which enable to emulsify the raw material, prior to fabrication.

The molten polymer, a solution of the polymer, or a plastic mass thereof, which may contain additional ingredients, may be fabricated into the desired shape by extruding through a suitable die, flowing, dipping, spraying, painting, molding rolling, etc. The fabricated object may, moreover, be subjected to a preliminary treatment prior to the hardening process of the present invention. For example, extrusion products upon issuing from a coagulating bath may be given a preliminary hardening treatment by passing them through a heated bath of glycerol or other suitable liquid.

The following examples are submitted for the purpose of illustrating suitable applications of our invention, and are not to be regarded as limitative.

Example I

A polymerization product, prepared by polymerizing butadiene at about 15°–20° C. in the presence of sodium is, after having been worked up, dissolved in benzene, to a concentration of about 10% polymer, and the solution filtered. The clear solution is then forced through a suitable spinning nozzle into a coagulating bath consisting of ethyl alcohol. The partially coagulated filament issuing from the coagulating bath is completely coagulated and partially hardened by passing it through a bath of glycerine held at about 130° C. The filament, which at this stage is non-sticky, of low tensile strength and of high extensibility (100% or more), is then hardened by heating it for 50–60 minutes at a temperature of 125°–130° C. in an atmosphere of carbon dioxide into which a few tenths of one percent of monochlor benzene vapor have been introduced. According to this method of fabricating we produced filaments free from discoloration and having tensile strengths greater than 3 kg/mm.$^2$ and extensibilities of about 5–10%.

Fibers produced by the "dry spinning" process, i. e., by spinning the polymer solution into a heated, vertically disposed tube, may be hardened in an analogous manner.

Example II

Parts of electrical apparatus may be protected and insulated by dipping them into a solution of the polymer, allowing the excess solvent to evaporate and then baking them at an elevated temperature in an inert atmosphere containing a small amount of monochlorbenzene vapor.

Example III

Metal and other objects may be made resistant to most solvents and many corrosive chemicals by treating them as in the above example. When coating flexible objects or objects subject to impact or severe vibration, a small amount of a suitable plasticizing agent such as tricresylphosphate may be added to the polymer. Contrary to expectation, we have found films containing as much as 25% tricresylphosphate remain strong and flexible.

Example IV

Films of various thickness may be prepared by flowing solutions of the polymer onto flat surfaces, allowing the solvent to evaporate and subjecting the films to a hardening treatment in the manner above described. These films have a greater tensile strength than similar films hardened in a comparative manner without the presence of a catalyst.

Films made according to Example IV from the products of polymerizing butadiene with vinyl chloride, vinyl bromide or vinyl acetate have been found to be especially strong.

Example V

Abrasive cloths and papers may be prepared by spraying a suitable base such as a 100 lb. rope paper base with the polymer solution into which a little plasticizer has been added, sprinkling a suitable abrasive material such as a graded crushed garnet evenly thereon during the evaporation of the solvent and finally subjecting the paper to a suitable hardening treatment as in Example II. Due to the water and solvent resistance of the hardened polymer, abrasive paper made from these polymers may be used with water, solvent or oil.

Numerous other applications of the present invention could be cited, for example, for the hardening of objects that are molded, pressed or rolled from a plastic composition in which the binder is a polymerization product of a diene hydrocarbon. Such plastics may be filled or extended with cork, wood flour, asbestos or other heat-stable fillers and may be colored with various heat-stable dyes, various blacks or various white or colored pigments.

Due to the lower temperatures and shorter time applicable when hardening according to the present invention, molded and pressed objects suffer considerably less deformation during the hardening treatment than objects hardened by previously known non-catalytic processes. The finished articles are free from sulfur and and may therefore be used for many purposes where sulfur-hardened products are inapplicable. The products hardened by the method of our invention are furthermore stronger and usually of lighter color.

We claim as our invention:

1. A process for hardening undistillable polymerization products of butadiene which comprises heating the polymerization product at a temperature of from 120° to 130° C. in contact with a substantially oxygen-free atmosphere to which chloro-benzene has been introduced prior to the contacting in at least an amount capable of catalytically effecting the hardening of the polymer under the conditions of the hardening treatment.

2. A process for hardening undistillable polymerization products of conjugated diene hydrocarbons which comprises heating the polymerization product at a temperature of from 120° to 130° C. in contact with a substantially oxygen-free atmosphere to which chloro-benzene has been introduced prior to the contacting in at least an amount capable of catalytically effecting the hardening of the polymer under the conditions of the hardening treatment.

3. A process for hardening undistillable polymerization products of conjugated diene hydrocarbons which comprises heating the polymerization product at a temperature from about 80° C. to about 150° C. in contact with a substantially oxygen-free atmosphere to which a halogenated hydrocarbon has been introduced prior to the contacting in at least an amount capable of catalytically effecting the hardening of the polymer under the conditions of the hardening treatment.

4. A process for hardening undistillable polymerization products of conjugated diene hydrocarbons which comprises heating the polymerization product at an elevated temperature not greater than about 200° C. in contact with a substantially oxygen-free atmosphere to which chloro-benzene has been introduced prior to the contacting in at least an amount capable of catalytically effecting the hardening of the polymer under the conditions of the hardening treatment.

5. A process for hardening undistillable polymerization products of butadiene which comprises heating the polymerization product at an elevated temperature not greater than about 200° C. in contact with a substantially oxygen-free atmosphere to which a halogenated hydrocarbon has been introduced prior to the contacting in at least an amount capable of catalytically effecting the hardening of the polymer under the conditions of the hardening treatment.

6. A process for hardening coagulated extrusion products composed of an undistillable polymerization product of a conjugated diene hydrocarbon which comprises heating the coagulated extrusion product at an elevated temperature not greater than about 200° C. in a substantially oxygen-free atmosphere containing vapors of a separately introduced halogenated hydrocarbon in a concentration capable of catalytically effecting the hardening of the product under the conditions of the hardening treatment.

7. A process for hardening undistillable polymerization products of butadiene which comprises heating the polymerization product at an elevated temperature not greater than about 200° C. in contact with a substantially oxygen-free atmosphere to which a halogenated aromatic hydrocarbon has been introduced prior to the contacting in at least an amount capable of catalytically effecting the hardening of the polymer under the conditions of the hardening treatment.

8. A process for hardening undistillable polymerization products of conjugated diene hydrocarbons which comprises heating the polymerization product at an elevated temperature not greater than about 200° C. in contact with a substantially oxygen-free atmosphere to which a halogenated aromatic hydrocarbon has been introduced prior to the contacting in at least an amount capable of catalytically effecting the hardening of the polymer under the conditions of the hardening treatment.

9. A process for hardening undistillable polymerization products of conjugated diene hydrocarbons which comprises heating the polymerization product at an elevated temperature not greater than about 200° C. in contact with a substantially oxygen-free atmosphere to which a halogenated hydrocarbon has been introduced prior to the contacting in at least an amount capable of catalytically effecting the hardening of the polymer under the conditions of the hardening treatment.

10. In a process for the fabrication of objects from an undistillable polymerization product of butadiene, the step of heating the relatively soft object at an elevated temperature not greater than about 200° C. in contact with a substantially oxygen-free atmosphere to which a halogenated aromatic hydrocarbon has been introduced prior to the contacting in at least an amount capable of catalytically effecting the hardening of the object under the conditions of the hardening treatment, whereby the object is strengthened, hardened and made more chemical-resistant.

11. In a process for the fabrication of objects from undistillable polymerization products of conjugated diene hydrocarbons, the step of heating the relatively soft object at an elevated temperature not greater than about 200° C. in contact with a substantially oxygen-free atmosphere to which a halogenated aromatic hydrocarbon has been introduced prior to the contacting in at least an amount capable of catalytically effecting the hardening of the object under the conditions of the hardening treatment, whereby the object is strengthened, hardened and made more chemical-resistant.

12. In a process for the fabrication of objects from undistillable polymerization products of conjugated diene hydrocarbons, the step of heating the relatively soft object at an elevated temperature not greater than about 200° C. in contact with a substantially oxygen-free atmosphere to which a halogenated hydrocarbon has been introduced prior to the contacting in at least an amount capable of catalytically effecting the hardening of the object under the conditions of the hardening treatment.

HEIN ISRAEL WATERMAN.
WILLEM LEENDERT JOHANNES DE NIE.